Sept. 21, 1965  G. E. NICHOLS  3,207,320
DESK MOUNT FOR CALENDAR PADS AND THE LIKE
Filed Aug. 17, 1962  2 Sheets-Sheet 1

INVENTOR.
Gordon E. Nichols
BY
Roberts, Cushman & Grover
ATT'YS

Sept. 21, 1965  G. E. NICHOLS  3,207,320

DESK MOUNT FOR CALENDAR PADS AND THE LIKE

Filed Aug. 17, 1962  2 Sheets-Sheet 2

INVENTOR.
Gordon E. Nichols
BY
Roberts, Cushman & Grover
ATT'YS

United States Patent Office 3,207,320
Patented Sept. 21, 1965

1

3,207,320
DESK MOUNT FOR CALENDAR PADS
AND THE LIKE
Gordon E. Nichols, Middleboro, Mass., assignor to Winthrop-Atkins Co., Inc., Middleboro, Mass., a corporation of Massachusetts
Filed Aug. 17, 1962, Ser. No. 217,672
9 Claims. (Cl. 211—49)

This invention relates to desk mounts for calendar pads and more especially to mounts provided with a support adapted to hold writing material, such as pens, pencils, memorandum pads, and the like.

The principal objects of the invention are to provide a mount which is sturdy, attractive, easy to manufacture by simple die-pressing operations, and which, by the simple expedient of changing its position and attaching the calendar pad to a different surface, provides mounts of different style.

As herein illustrated, the mount comprises a support having parts disposed at an acute angle to each other to provide a wedge-shaped pocket and a part opposite the acute angle containing one or more openings affording access to the pocket through which one or more items of writing material may be thrust into the pocket for engagement with the parts adjacent the acute angle. A rigid panel is hingedly connected to one of the parts of the support for disposition at an angle thereto, extending away from the support, and there is means operative rigidly to hold the panel at an angle to the support such that the face of the panel is inclined away from the part of the support opposite the acute angle. In one form of the invention the parts constituting the pocket collectively form a base on which the panel rests. In another form of the invention the parts which constitute the pocket provide a leg to which an edge of the panel is connected. The means operative to hold the panel at an acute angle to the support may comprise one or more stiff but non-resilient deformable elements incorporated in the hinge with its opposite ends secured to the part and support at opposite sides of the hinge. In lieu of the deformable element, a stiff brace may be hingedly connected at one end to the rear side of the panel and engageable at its distal end with the support. The walls of the parts defining the angle are comprised of a stiff, resilient sheet material displaceable by insertion of an object into the pocket to grip the same. When the base provides a support the writing materials project forwardly from the front side of the mount, inclined upwardly, slightly to the horizontal, and when the base is employed as a leg, the writing material projects upwardly from the mount.

The invention will now be described in greater detail with reference to the accompanying drawings wherein.

2

Figure 10:
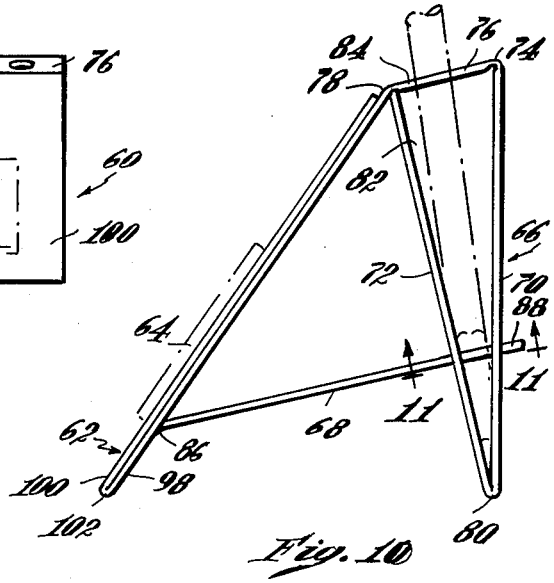
FIG. 10 is a side elevation of the mount shown in FIG. 8.
Figure 9:
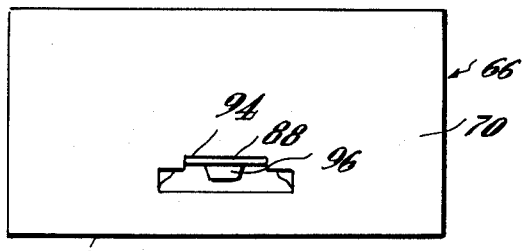
FIG. 9 is a rear elevation of the mount shown in FIG. 8.
Figure 12:
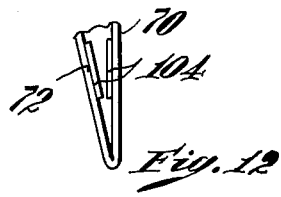
Figure 13:
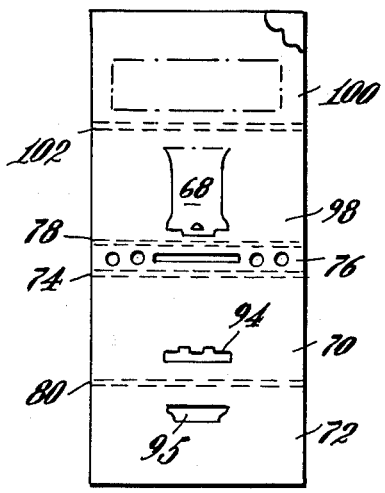
Figure 11:
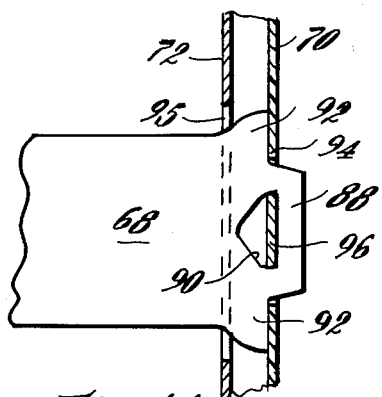

FIG. 11 is a fragmentary detail taken on the line 11—11 of FIG. 10;

FIG. 12 is a fragmentary end elevation adjacent the dihedral angle at the lower end of the leg, showing friction strips applied to the opposed surfaces of the walls to enhance frictional engagement with an item thrust into the pocket;

FIG. 13 is a plan view of a blank from which the mount is made.

In its simplest form, the mount comprises a rigid panel 10 and a base 12 for supporting the panel 10 in an upright, rearwardly inclined position. The front face of the panel 10 is adapted to have a calendar pad 14 fastened thereto and to have applied to the areas above and/or below the calendar pad advertising media. The base is hollow and is of triangular cross-section, having walls 16 and 18 joined by a hinge 20 to form an acute dihedral angle between the walls, and a wall 22 opposite the dihedral angle containing one or more openings 24 affording access to the wedge-shaped pocket within the base. The pocket is adapted to hold one or more items of writing material such as pens, pencils, memorandum pads, and the like, which may be thrust through the openings into the pocket and to be retained therein by frictional engagement of their ends with the converging portions of the walls 16 and 18.

The mount is comprised of a stiff, resilient sheet paperboard so that when items of writing material are thrust into the pocket the boards are deflected away from each other and thereby caused to grip the ends situated between them.

The panel 10 is connected to the wall 22 by a hinge 25 and the wall 22 is connected to the wall 18 by a hinge 28. Each of the hinges 20, 25 and 28 includes one or more strips 26 of non-resilient deformable material which have their opposite ends attached to the parts at opposite sides of the hinge, and thus will hold the adjacent parts at a predetermined angle to each other.

Figure 1:
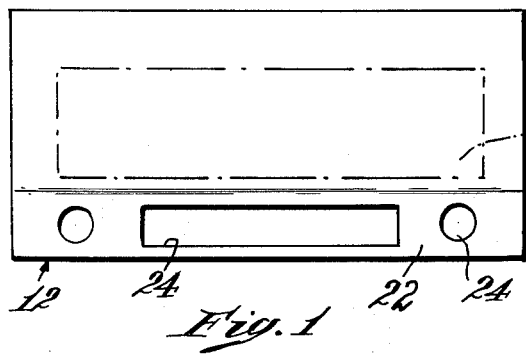
FIG. 1 is a front elevation of one form of the invention.
Figure 2:
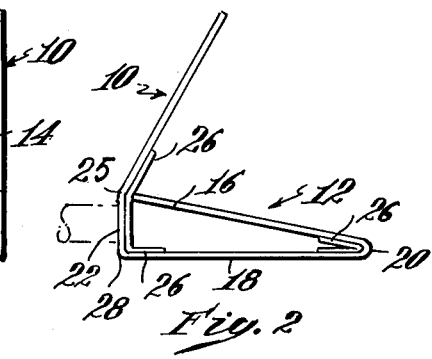
FIG. 2 is an end elevation of FIG. 1.

In the form of the invention shown in FIG. 2, the distal end of the wall 16 abuts the inner side of the wall 22 at the junction of the panel 10 with the wall 22 and is supported in this position partly by the hinge strips 26 and partly by rearward bending of the panel 10 which forms a dihedral angle into which the distal end of the wall seats.

Figures 3, 4:
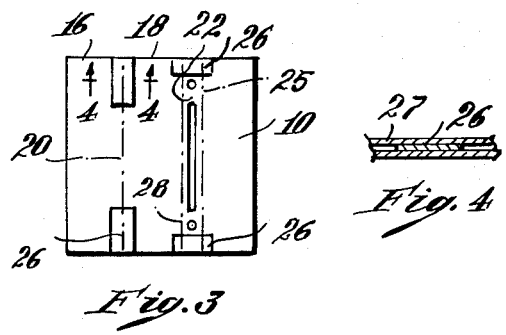
FIG. 3 is a plan view of the blank from which the mount is made.
FIG. 4 is an enlarged fragmentary section taken on the line 4—4 of FIG. 3.

The blank for the mount, as shown in FIG. 3, is of very simple construction, admirably adapted for high-speed manufacture as it may be cut out in a single die-pressing operation by feeding a strip of sheet material through a die-pressing machine. The several sections making up the blank, correspondingly numbered, are formed in succession for folding on spaced parallel hinge lines embossed or scored at the time the blank is cut from the strip. The deformable hinge strip 26 is secured in place by an adhesive strip 27 applied over it (FIG. 4), or by covering paper in conventional fashion.

Figure 5:
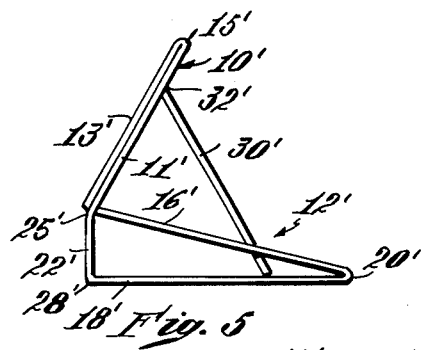
FIG. 5 is an end elevation of a first modification corresponding in front elevation to the mount shown in FIG. 1, and differing therefrom by having a brace.
Figure 6:
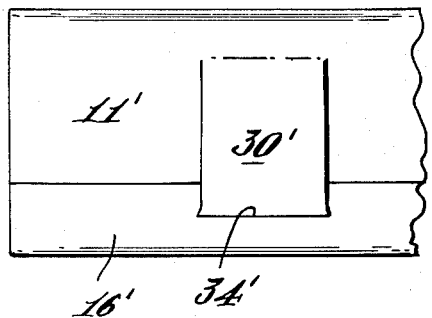
FIG. 6 is a rear elevation of FIG. 5.

The first modification of the amount, as shown in FIG. 5, comprises a panel 10' and base 12' for supporting the panel 10' in an upright, rearwardly inclined position. The base is of triangular cross-section comprising walls 16' and 18' joined by a hinge 20' and a wall 22' opposite the dihedral angle formed by the walls 16' and 18'. The wall 22' is connected to the wall 18' by a hinge 28' and the panel 10' is connected to the wall 22' by a hingle 25'. The panel 10' is supported in its upright position relative to the base 12' by a brace 30', which is cut out of the rear ply 11' of the panel 10', and is connected by a hinge 32' to the rear ply, so that it may be swung rearwardly for engagement of its distal end with the base. An opening 34' is provided in the wall 16' of the base through which the distal end of the brace passes and the latter has a flared end 36' adapted to be locked in a recess 38' in the opening with its ends abutting the wall 18', thus holding the walls 16' and 18' at the desired angle and at the same time holding the panel 10' at an angle to the base 12'. The panel 10' has a front ply 13' connected to the rear ply 11' by a hinge 15', so that it may be folded upwardly to expose the contacting faces of the plies.

Figure 7:
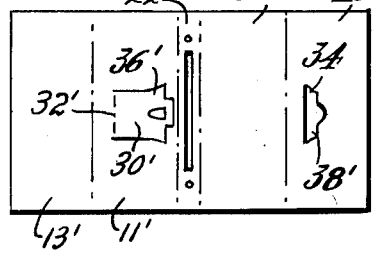
FIG. 7 is a plan view of the blank from which the mount is made.
Figure 8:
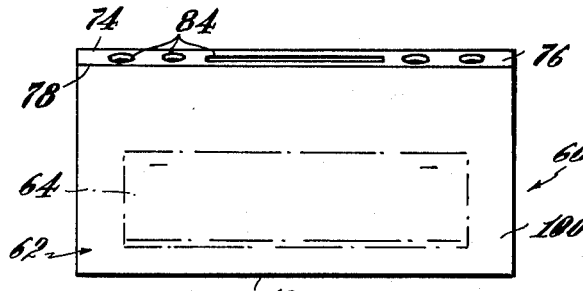
FIG. 8 is a front elevation of a second modification of the invention.

The blank from which the mount shown in FIG. 5 is formed in shown in FIG. 7, and, again, is susceptible of manufacture from strip material by a simple die-pressing operation in which the several openings, brace and score lines may be formed at one operation. The parts of the blank are designated by the reference characters applied to these parts in the mount as set up.

In a second modification, the mount 60 comprises a panel 62 to which a calendar pad 64 may be attached, supported in an upright, rearwardly inclined position by a leg 66, the latter being held at an angle to the panel by a brace 68. The leg has upwardly diverging walls 70 and 72 connected at one end by a hinge 80. A wall 76 is connected by a hinge 74 to the wall 70 and by a hinge 78 to the panel 62. The wall 72 abuts the wall 76 at its junction with the panel 62 and is held in angularly spaced relation to the wall 70, partly by the brace 68 and partly by engagement of its distal end with the inner side of the hinge 78. A wedge-shaped pocket 82 is provided between the walls 70 and 72, which is adapted to receive writing material such as pencils, pens, memorandum pads, and the like, and access to the pocket is afforded through one or more openings 84 in the wall 76. The amount is comprised of a stiff, resilient sheet board and the angle between the walls 70 and 72 is such that when an item is trust into the pocket it deflects the walls thus causing them to grip the end inserted between them. The angle between the walls 70 and 72 is preserved by the brace 68, the distal end of which is provided with a tongue 88 containing an opening 90 and having at its opposite sides lateral shoulders 92. The walls 70 and 72 contain openings 94 and 95 through which the end of the brace extends. The opening 94 contains a downwardly projecting tongue 96 engaged within the opening 90 and the rear edges of the shoulders 92 abut the inner side of the wall 70, while the forward sides of the shoulders 92 engage the inner side of the wall 72 at the opposite end of the opening 95, thus holding the walls 70 and 72 in the angular relation desired with the upper edge of the wall 72 situated in firm engagement with the hinge 78.

The panel 62 may be of single ply construction, or, as herein shown, comprised of two plies 98 and 100, the ply 100 overlying the ply 98 and constituting a cover panel connected at its lower edge to the ply 98 by a hinge 102, so that it may be tilted forwardly away from the ply 98 to expose its undersurface and the upper surface of the ply 98.

The blank of which the mount is comprised is shown in FIG. 13, with its parts identified by the reference characters which correspond to the same parts of the foregoing description and is covered on one or both sides with a decorative paper.

As related above, the angle between the diverging walls 70 and 72 is such as frictionally to grip the end of a writing implement or pad to hold it in place; however, to avoid criticalness in the angle, the inner surfaces of the walls adjacent the vertex of the dihedral angle (FIG. 12) may have applied to them strips 104 of an elastic or yieldable material or an abrasive material to increase the frictional hold on the end of the item thrust into the pocket.

This application has the same assignee as Serial No. 217,701 and Serial No. 217,695, of Edward M. Stolarz, filed on even date and has in common, means for supporting one or more items of writing material.

It should be understood that the present disclosure is for the purpose of illustration only and that this invention includes all modifications and equivalents falling within the scope of the appended claims.

I claim:

1. A structure comprising hingedly connected parts including triangularly disposed parts and a part disposed at an angle to one of the sides of the triangularly disposed parts, said triangularly disposed parts being held in triangular relation to each other by engagement of an end of one of the triangularly disposed parts within the dihedral angle formed at the intersection of another of the triangularly disposed parts and the part disposed at an angle to said one of the sides, and means embodied in the hinge connecting said part disposed at said angle operative to hold said part at a predetermined angular position.

2. A structure comprising hingedly connected parts adapted to be disposed in triangular relation to each other, with two of the parts making an acute angle, a third part opposite the acute angle, one edge of which is connected to the divergent edge of one of the two parts and the other edge of which abuts but is not connected to the divergent edge of the other of the two parts, a fourth part disposed at an angle to the other of the two parts and forming with the third part a dihedral angle within which the divergent end of said other of the two parts is lodged and held thereby in triangular relation to the one of the two parts and the third part, and means holding the fourth part at said dihedral angle with the third part.

3. A structure according to claim 2, wherein the means operative to hold the fourth part at said dihedral angle is a stiff, but non-resilient deformable element incorporated in the hinge connecting the fourth part to the triangularly disposed parts.

4. A structure according to claim 2, wherein the means operative to hold the fourth part at said dihedral angle is a stiff brace hingedly connected at one end to the fourth part and engageable at its distal end with the third part.

5. A structure according to claim 2, wherein the triangularly disposed parts collectively constitute a pocket and provide a base on which the fourth part rests.

6. A structure according to claim 2, wherein the triangularly disposed parts collectively provide a pocket and a leg to which an end of the fourth part is connected.

7. A structure according to claim 2, wherein the part opposite the acute angle contains an opening and there are means applied to the opposed parts adjacent the acute angle to augment retention of writing material thrust through the openings in the pocket.

8. A structure according to claim 2, wherein the triangularly disposed parts constitute a pocket, the part opposite the acute angle contains openings through which writing material may be thrust into the pocket, and there is yieldable means applied to the opposed walls of the parts adjacent the acute angle to augment retention of the writing material thrust into the pocket.

9. A structure according to claim 2, wherein the triangularly disposed parts constitute a pocket, the part opposite the acute angle contains openings affording access to the pocket, and there are strips of abrasive material applied to the opposed walls of the parts adjacent the acute angle to augment retention of writing material thrust into the pocket.

References Cited by the Examiner

UNITED STATES PATENTS

| 1,386,700 | 8/21 | Gilbert | 150—34 |
| 2,003,482 | 6/35 | Fancher | 248—198 |

FOREIGN PATENTS 599,742  6/60  Canada.

CLAUDE A. LE ROY, *Primary Examiner.*